United States Patent
Kim (10) Patent No.: US 8,970,805 B2
(45) Date of Patent: Mar. 3, 2015

(54) DISPLAY DEVICE AND METHOD OF MANUFACTURING THE SAME

(71) Applicant: LG Display Co., Ltd., Seoul (KR)

(72) Inventor: Geon Yong Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 152 days.

(21) Appl. No.: 13/715,566

(22) Filed: Dec. 14, 2012

(65) Prior Publication Data

US 2013/0293804 A1 Nov. 7, 2013

(30) Foreign Application Priority Data

May 1, 2012 (KR) ........................ 10-2012-0046012

(51) Int. Cl.
*G02F 1/1333* (2006.01)
*B29C 65/54* (2006.01)
*G02F 1/1335* (2006.01)

(52) U.S. Cl.
CPC ........ *G02F 1/133308* (2013.01); *B29C 65/542* (2013.01); *G02F 1/133512* (2013.01); *G02F 2001/133317* (2013.01); *G02F 2001/13332* (2013.01); *G02F 2202/28* (2013.01)
USPC ................ 349/58; 349/122; 349/65; 349/187

(58) Field of Classification Search
CPC ............ G02F 1/133308; G02F 1/1333; G02F 1/133615; G02F 1/1335; G02F 1/133524; G02F 1/133608; G02F 2001/133317; G02F 2001/133314; G02F 2001/133325; G02F 2001/133322; G02F 2001/13332; G02F 2001/133328; G02F 2001/133354; G02F 2001/133331; G02F 2002/28; G02F 2201/50; G02F 2201/503; G02F 2201/46; H05K 5/0217; H05K 5/03; H05K 5/00; H05K 7/14; G06F 1/1601; G06F 1/1637; G02B 6/00; G02B 6/0095
USPC ........... 349/58, 65, 122, 60, 187; 361/679.01, 361/752, 767, 807, 809; 362/97.1, 97.2; 156/305, 275.5
See application file for complete search history.

(56) References Cited

U.S. PATENT DOCUMENTS 8,026,996 B2 * 9/2011 Matsuhira et al. .............. 349/60
2010/0123850 A1 5/2010 Miyashita
2011/0187956 A1 8/2011 Kim et al.
(Continued)

FOREIGN PATENT DOCUMENTS

EP 2551717 A2 1/2013
JP 2006276623 A 10/2006
(Continued)

*Primary Examiner* — Thoi Duong
(74) *Attorney, Agent, or Firm* — Brinks Gilson & Lione (57) ABSTRACT

A display device includes a display panel including an upper substrate and a lower substrate facing-coupled to a rear surface of the upper substrate, a backlight unit supplying light to the display panel, a cover member receiving the display panel and covering a side surface of the display panel, a guide frame supporting the display panel and guiding a position of the display panel and a position of the backlight unit, and an adhesive member injected between the guide frame and the display panel and coupling the guide frame and the display panel. The guide frame includes a horizontal part and a first prevention jaw formed to protrude from one end of the horizontal part, and preventing the adhesive member from being injected into the backlight unit when injecting the adhesive member.

10 Claims, 7 Drawing Sheets

(56) References Cited

U.S. PATENT DOCUMENTS

2011/0236643 A1 9/2011 Tsubouchi et al.
2013/0027857 A1 1/2013 Jeong

FOREIGN PATENT DOCUMENTS

| KR | 20080001745 A | 1/2008 |
| KR | 20110090029 A | 8/2011 |

* cited by examiner

DISPLAY DEVICE AND METHOD OF MANUFACTURING THE SAME

CROSS-REFERENCE TO RELATED APPLICATIONS

This application claims the benefit of the Korean Patent Application No. 10-2012-0046012 filed on May 1, 2012, which is hereby incorporated by reference as if fully set forth herein.

BACKGROUND

1. Field of the Disclosure

The present disclosure relates to a display device, and more particularly, to a display device and a method of manufacturing the same, in which, by removing at least one case and set cover, the thickness of the display device and the width of a front border are minimized, and the step height of the front border is removed.

2. Discussion of the Related Art

Recently, flat panel display devices, with decreased weight and volume relative to the cathode ray tubes (CRTs), are being developed. Liquid crystal display (LCD) devices, plasma display panels (PDPs), field emission display (FED) devices, and light emitting display devices are actively being researched as flat type display devices. However, among such flat panel display devices, LCD devices are easily manufactured, have good drivability of drivers, realize a high-quality image, and thus are attracting much attention.

In terms of technology and design interesting to consumers, recently, research and development of flat panel display devices are increasingly required. Therefore, efforts are being continuously made for minimizing (slimming) the thicknesses of display devices, and research is increasingly conducted on a design with enhanced aesthetic appearance that can induce consumers to buy by appealing to the consumers' sense of beauty.

However, in design development for enhancing a scene of beauty or slimming of display devices that have been made to date, elements configuring a related art display device have been applied as is, and the structures of the elements have been changed. Due to these reasons, there are limitations in slimming display devices and developing the new designs of the display devices.

For example, in LCD devices of the related art, a lower case and a front case are necessarily used for receiving a liquid crystal display panel and a backlight unit, and moreover, a separate front set cover and rear set cover are additionally used for applying the LCD devices to notebook computers, monitors, mobile devices, televisions, etc.

As described above, display devices of the related art necessarily use the front set cover and rear set cover as well as the lower case and front case, and consequently, there are limitations in reducing the thicknesses of LCD devices or changing the designs thereof. Particularly, the front set cover and rear set cover necessarily cover a top edge of a liquid crystal display panel. Due to this reason, the thicknesses of display devices inevitably become thicker, and moreover, the border widths of the display devices enlarge. In addition, it is difficult to realize various innovative designs due to a step height in a border portion.

SUMMARY

A display device includes: a display panel including an upper substrate and a lower substrate facing-coupled to a rear surface of the upper substrate; a backlight unit that supplies light to the display panel; a cover member that receives the display panel, and covers a side surface of the display panel; a guide frame that supports the display panel, and guides a position of the display panel and a position of the backlight unit; and an adhesive member injected between the guide frame and the display panel, and coupling the guide frame and the display panel, wherein, the guide frame includes: a horizontal part; and a first prevention jaw formed to protrude from one end of the horizontal part, and preventing the adhesive member from being injected into the backlight unit when injecting the adhesive member.

In another aspect of the present invention, there is provided a method of manufacturing a display device including: placing a backlight unit, which supplies light to a display panel, in a cover member, and assembling a guide frame that includes a horizontal part and a first prevention jaw formed to protrude from one end of the horizontal part, and guides a position of the display panel and a position of the backlight unit; injecting an adhesive member into a space formed by the horizontal part, the first prevention jaw, and the cover member, the adhesive member coupling the display panel to the guide frame; and coupling the display panel to the guide frame and the cover member for the adhesive member to couple the guide frame and the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device and a method of manufacturing the same according to the present invention will be described in detail with reference to the accompanying drawings.

Figure 1:
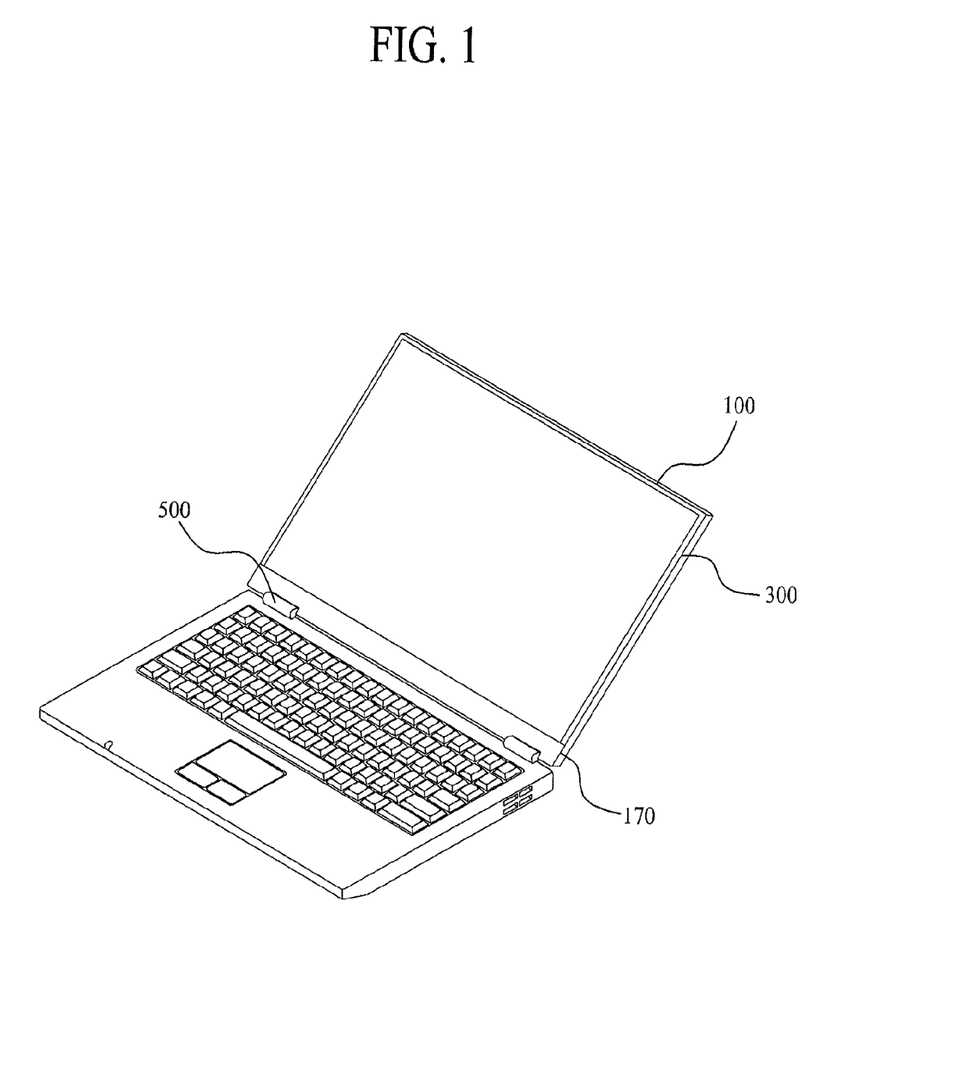
FIG. 1 is a perspective view illustrating an embodiment to which a display device according to the present invention is applied.
Figure 2:
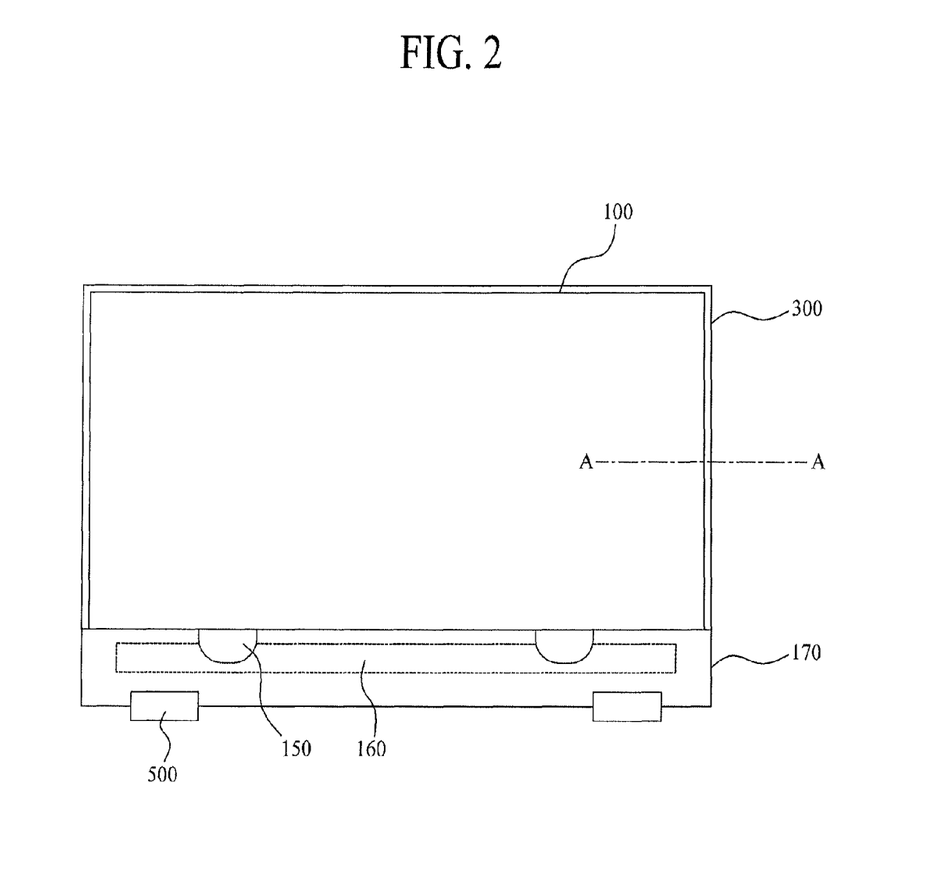
FIG. 2 is a plan view illustrating an embodiment of a display device according to the present invention.
Figure 3:
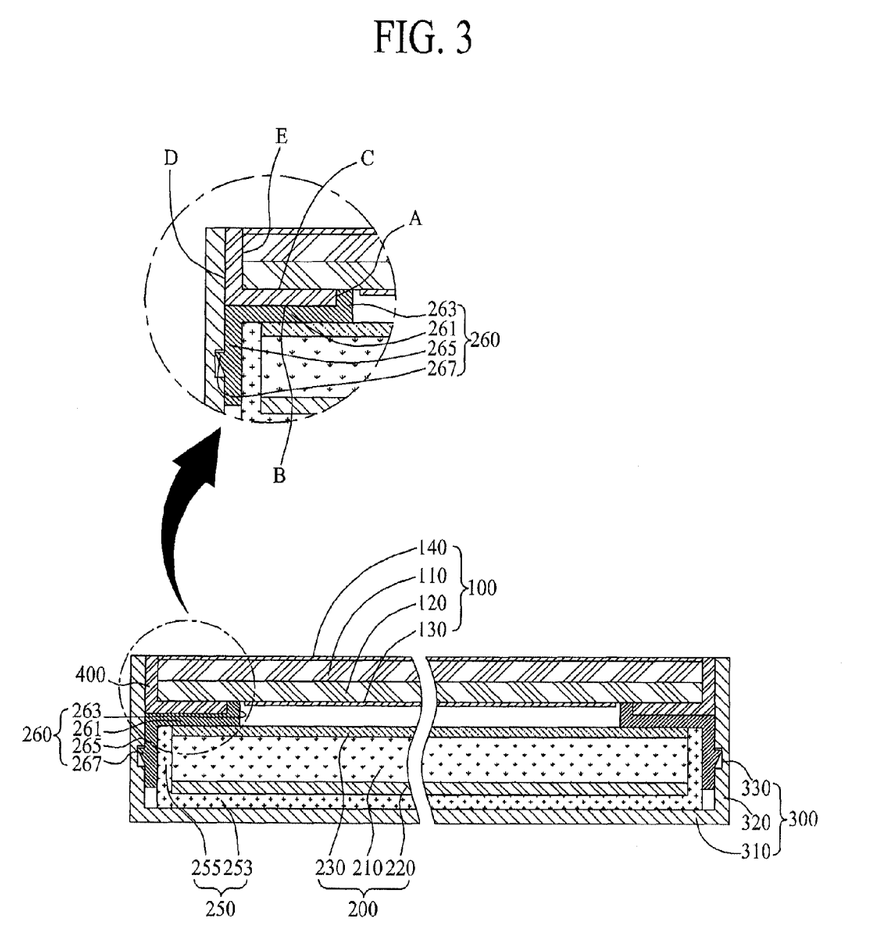
FIG. 3 is a sectional view taken along line A-A of FIG. 2.

FIG. 1 is a perspective view illustrating an embodiment to which a display device according to the present invention is applied. FIG. 2 is a plan view illustrating an embodiment of a display device according to the present invention. FIG. 3 is a sectional view taken along line A-A of FIG. 2.

As seen in FIGS. 1 to 3, a display device according to an embodiment of the present invention may include a display panel 100, a backlight unit 200, a cover member 300, and an adhesive member 400.

The display panel 100 may include an upper substrate 110, a lower substrate 120 that is facing-coupled to the upper substrate 110 with a liquid crystal layer (not shown) therebetween, a lower polarizing film 130 that is formed at a rear surface of the lower substrate 120, and an upper polarizing film 140 that is formed at a front surface of the upper substrate 110.

The lower substrate 120 includes a plurality of pixels (not shown) that are respectively formed in a plurality of areas defined by intersections between a plurality of gate lines (not shown) and a plurality of data lines (not shown). Each of the pixels may include a thin film transistor (TFT, not shown) connected to a gate line and a data line, a pixel electrode connected to the TFT, and a common electrode that is formed adjacently to the pixel electrode and receives a common voltage. In this case, the common electrode may be formed in the upper substrate 110 depending on a driving mode of the liquid crystal layer. The lower substrate 120 generates an electric field corresponding to a difference voltage between the common voltage and a data voltage applied to each pixel, thereby adjusting light transmittance of the liquid crystal layer.

The upper substrate 110 includes a plurality of color filters corresponding to the respective pixels formed in the lower substrate 120, and is facing-coupled to the lower substrate 120 with the liquid crystal layer therebetween. In this case, a plurality of common electrodes receiving the common voltage may be formed in the upper substrate 110 depending on the driving mode of the liquid crystal layer. In the upper substrate 110, the color filters filter incident light passing through the liquid crystal layer to emit certain color light to the outside, thereby enabling the display panel 100 to display a certain color image.

The lower substrate 120 and the upper substrate 110 may be formed in various types known to those skilled in the art, depending on the driving mode of the liquid crystal layer, for example, a twisted nematic (TN) mode, a vertical alignment (VA) mode, an in-plane switching (IPS) mode, and a fringe field switching (FFS) mode.

The lower polarizing film 130 may be adhered to the rear surface of the lower substrate 120. The lower polarizing film 130 is adhered to the rear surface of the lower substrate 120 and polarizes light irradiated from the backlight unit 200 to the display panel 100.

The upper polarizing film 140 is formed at the front surface of the upper substrate 110 and polarizes light passing through the display panel 100. In another embodiment, the upper polarizing film 140 may be extended longer by a predetermined length than the upper substrate 110 in a length direction. In this case, although not shown, an extension portion of the upper polarizing film 140 may be extended longer by a predetermined length than the upper substrate 110 in at least one or more length directions. That is, in three sides or four sides of the display panel 100, the upper polarizing film 140 may be extended longer than the upper substrate 110 in a length direction.

Although not shown, a retarder film may be formed at a top of the upper polarizing film 140. The retarder film may be overall coupled to an entire surface of the upper polarizing film 140, and may include a plurality of first retarder patterns formed at certain intervals and a plurality of second retarder patterns formed in respective spaces between the plurality of first retarder patterns.

The retarder film is coupled to the entire surface of the upper polarizing film 140, and separates a left-eye image and a right-eye image. To this end, the retarder film includes: the first retarder patterns that are formed to overlap a vertical line or horizontal line of the display panel 100 displaying the left-eye image; and the second retarder patterns that are formed to overlap a vertical line or horizontal line of the display panel 100 displaying the right-eye image. The first and second retarder patterns change the optical axises of the left-eye image and right-eye image, emitted from the display panel 100 to the outside, to different optical axises.

The display device according to an embodiment of the present invention, as seen in FIG. 2, may further include: a plurality of circuit films 150 coupled to a pad part that is prepared at an edge portion of the lower substrate 120 corresponding to a first side of the display panel 100; a printed circuit board (PCB) 160 coupled to the plurality of circuit films 150; a deco cover 170 coupled to the cover member 300 to cover the pad part, the plurality of circuit films 150, and the PCB 160; and a coupling hinge 500.

A data driving IC (not shown) for supplying data signals to the display panel 100 is mounted on each of the circuit films 150. Furthermore, a gate driving circuit (not shown) for supplying a gate (scan) signal to the display panel 100 is formed in the lower substrate 120 of the display panel 100 by a TFT manufacturing process. The circuit films 150 are adhered to the pad part of the display panel 100 and the PCB 160 by a tape automated bonding (TAB) process, and may be implemented as a tape carrier package (TCP) or a chip on flexible board (chip on film, COF). Therefore, the display panel 100 is electrically connected to the PCB 160 through the circuit films 150.

The PCB 160 is electrically connected to the circuit films 150, and supplies various signals for displaying an image to the display panel 100. A timing controller (not shown), various power source circuits (not shown), and a memory (not shown) that are used to control driving of the display panel 100 are mounted on the PCB 160.

The deco cover 170 is coupled to the cover member 300 corresponding to the first side of the display panel 100 to cover the pad part of the display panel 100, the circuit films 150, and the PCB 160, thereby preventing the pad part of the display panel 100, the circuit films 150, and the PCB 160 from being exposed to the outside. In an embodiment, the deco cover 170 may include a hook member (not shown) that is formed at both side surfaces of the display panel 100 and coupled to the cover member 300.

When the display device according to the present invention is applied to a notebook computer, as illustrated in FIG. 1, the coupling hinge 500 connects the display panel 100 to a body of the notebook computer. Therefore, when the display device according to the present invention is a monitor or a television (TV), the coupling hinge 500 may not be provided.

The backlight unit 200 includes a light guide panel 210, a reflective sheet 220, and an optical member 230 that are placed in the cover member 300.

The light guide panel 210 is formed in a flat shape (or wedge shape), and transfers light, which is incident from a light source (not shown) through an incident light surface, to the display panel 100. In this case, the light source may be configured with at least one fluorescent lamp or light emitting diode (LED).

The reflective sheet 220 is disposed at a rear surface of the light guide panel 210, and reflects light, which is incident from the light guide panel 210, to the display panel 100.

The optical member 230 is disposed on the light guide panel 210, and enhances the luminance characteristic of light traveling from the light guide panel 210 to the display panel 100. To this end, the optical member 230 may include at least one diffusive sheet and prism sheet of a lower diffusive sheet, a lower prism sheet, an upper prism sheet, and an upper prism sheet.

The display device according to an embodiment of the present invention may further include a supporting case 250 and a guide frame 260.

The supporting case 250 is placed in the cover member 300, supports the guide frame 260, and receives the backlight unit 200. To this end, the supporting case 250 includes a supporting plate 253 that supports the backlight unit 200, and a supporting side wall 255 that is bent vertically from an edge portion of the supporting plate 253.

The guide frame 260 supports the display panel 100, and guides the position of the display panel 100 and the position of the backlight unit 200. To this end, the guide frame 260 includes a horizontal part 261 that is horizontally extended and formed, and a first prevention jaw that is formed to protrude from one end of the horizontal part 261.

The horizontal part 261 may be horizontally extended, and supported by a supporting side wall 255 of the supporting case 250. Although not shown, depending on the case, a certain groove for receiving the adhesive member 400 may be formed in the horizontal part 261. The certain groove may be used as a space into which the adhesive member 400 are injected. Also, the certain groove may be used to enlarge an adhesive area for strengthening adhesive strength between the adhesive member 400 and the horizontal part 261. Depending on the case, the certain groove may be formed in a structure having a plurality of protrusions or recessed portions.

The first prevention jaw 263 prevents the adhesive member 400 from being injected into the backlight unit 200 when the adhesive member 400 is injected. Also, when the adhesive member 400 is compressed by the display panel 100 and thereby deformed between the horizontal part 261 and the first prevention jaw 263, the first prevention jaw 263 prevents the adhesive member 400 from being injected into the backlight unit 200.

The guide frame 260 may further include a guide side wall 265 that is bent vertically from the horizontal part 261 and coupled to the cover member 300, and a first coupling part 267 that is formed to protrude from the guide side wall 265.

The guide side wall 265 is bent vertically from one side of the horizontal part 261 adjacent to the cover member 300, and coupled to the cover member 300 by the first coupling part 267.

The first coupling part 267 is formed to protrude from an outer side surface of the guide side wall 265 so as to have a stepped surface and an inclined surface. In an embodiment, the first coupling part 267 is formed to have a rectangular shape of sectional surface, at the outer side surface of the guide side wall 265.

The cover member 300 may include a set plate 310, a side part 320, and a second coupling part 330.

The cover member 300 receives the display panel 100, and covers the side surface of the display panel 100. The cover member 300 supports the supporting case 250 with the backlight unit 200 placed therein, and surrounds the side surface of the display panel 100 and a side surface of the guide frame 260, thereby acting as a rear product cover and side product cover of a produced display device.

The set plate 310 is formed in a flat shape, and supports the supporting case 250 with the backlight unit 200 placed therein, thereby acting as a rear product cover of a produced display device. In an embodiment, the set plate 310 may be coupled to the supporting case 250 by a plurality of screws that are screwed to the supporting plate 253 of the supporting case 250.

The side part 320 is formed to be bent vertically from an edge portion of the set plate 310. In this case, the side part 320 may be formed to the same height as that of upper polarizing film 140 in the display panel 100. The side part 320 is externally exposed to surround the side surface of the display panel 100 and the side surface of the guide frame 260, thereby acting as a side product cover of a produced display device. Also, the side part 320 is formed to the same height as that of the upper polarizing film 140, and is not disposed at a top of the upper polarizing film 140 (or a top of the display panel 100). Accordingly, the step height of a border portion is removed, and thus, an aesthetic appearance can be enhanced in terms of a design.

The second coupling part 330 is concavely formed to have a certain depth from an inner side wall of the side part 320 in correspondence with the first coupling part 267. Therefore, the first coupling part 267 is inserted into the second coupling part 330, thereby coupling the guide frame 260 and the cover member 300. Here, the stepped surface of the first coupling part 267 prevents the deviation of the first coupling part 267 coupled to the second coupling part 330, and the inclined surface of the first coupling part 267 facilitates the coupling of the first and second coupling parts 267 and 330.

In the above-describe embodiment, the guide frame 260 and the cover member 300 have been described as being coupled to each other, but are not limited thereto. In consideration of the design of the display device, the guide frame 260 may be coupled to the supporting side wall 255 of the supporting case 250. In this case, the cover member 300 may be coupled to the supporting case 250 by a plurality of screws that are screwed to the supporting plate 253 of the supporting case 250.

The adhesive member 400 is injected between the guide frame 260 and the display panel 100, thereby coupling the guide frame 260 and the display panel 100.

The adhesive member 400 is adhered to one side wall (A surface) of the first prevention jaw 263, an upper side surface (B surface) of the horizontal part 261, and a lower side surface (C surface) of the display panel 100, thereby coupling the guide frame 260 and the display panel 100.

In addition, the adhesive member 400 is further adhered to an inner wall (D surface) of the cover member 300 and a side wall (E surface) of the display panel 100, thereby more solidly coupling the guide frame 260, the display panel 100, and the cover member 300.

The adhesive member 400 is formed of a material absorbing light or in a color absorbing light, and prevents light, emitted from the backlight unit 200, from passing through adhesive member 400. To this end, the adhesive member 400 may be formed of a material that does not pass through light, or in a black-based color. Irrespective of this, the adhesive member 400 may be formed in the same color as that of the cover member 300 in terms of an aesthetic appearance.

In an embodiment, the adhesive member 400 may be formed of one of an urethane-based material, an acrylic-based material, an epoxy-based material, and a cyanoacrylate-based material.

In an embodiment, the adhesive member 400 may be formed to have viscosity of 230,000 cp to 650,000 cp, and formed to have a density of 1270 kg/m³ to 1534 kg/m³. Also, the adhesive member 400 may be hardened for 1.5 minutes to 65 minutes, and formed in black.

Figure 4:
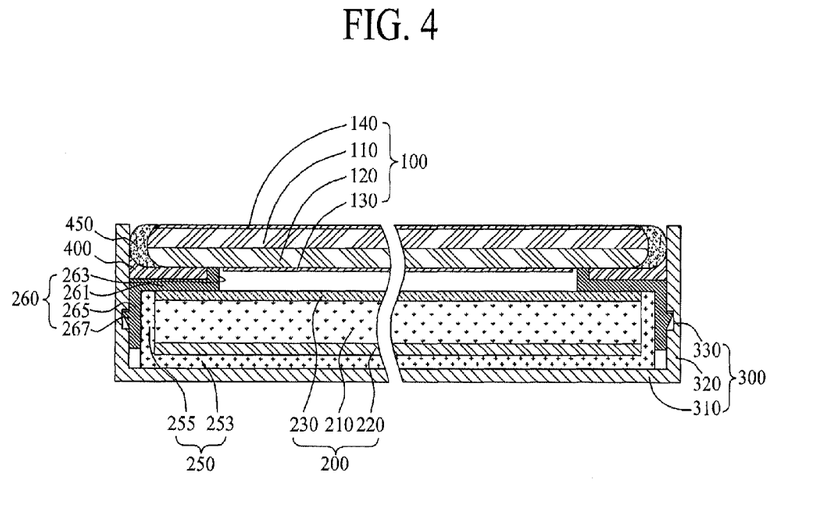
FIG. 4 is a sectional view illustrating another embodiment of the display device according to the present invention.

FIG. 4 is a sectional view illustrating another embodiment of the display device according to the present invention.

As seen in FIG. 4, a display device according to another embodiment of the present invention may include the display panel 100, the backlight unit 200, the cover member 300, the adhesive member 400, and a bumper part 450. In the following description, to avoid a repetitive description, differences between the embodiment of FIG. 3 and the embodiment of FIG. 4 will be described.

The bumper part 450 is formed to be extended from the side wall of the display panel 100, and protects the side wall of the display panel 100.

The bumper part 450 may be formed of a silicon-based or ultraviolet (UV)-setting sealant (or resin), but, in consideration of a process tack time, the bumper part 450 may be formed of a UV-setting sealant. In this case, the viscosity of the sealant may have a range from 1,500 cps to 30,000 cps, but is not limited thereto. The viscosity of the sealant may be selected depending on a formation process time.

In this case, the sealant may be a material absorbing light or have a color absorbing light, and prevents light, emitted from the backlight unit 200, from passing through bumper part 450. That is, the bumper part 450 may be formed of a material that does not pass through light, or in a black-based color. Irrespective of this, the bumper part 450 may be formed in the same color as that of the cover member 300 in terms of an aesthetic appearance.

The bumper part 450 is coupled to a distal end of the upper polarizing film 140, and prevents the upper polarizing film 140 from being partially detached from the upper substrate 110.

The bumper part 450 prevents the display panel 100 from directly contacting the cover member 300, thereby acting as a buffering agent against an impact.

Figure 5:
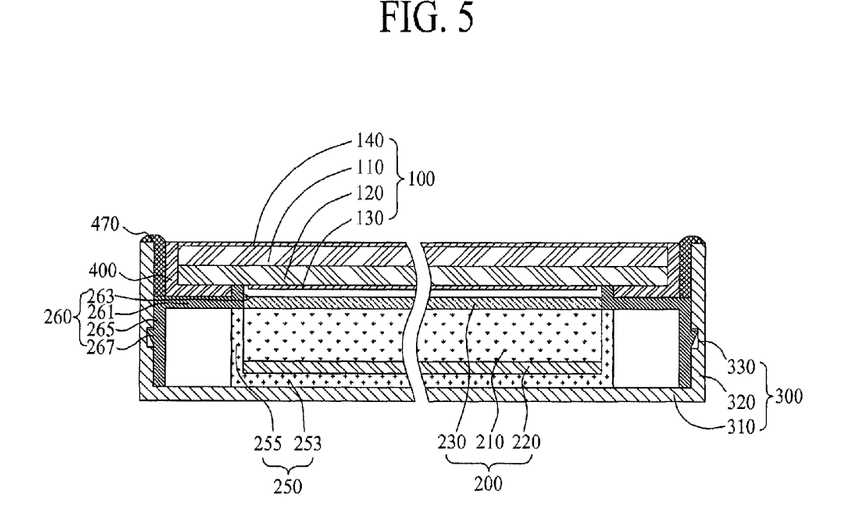
FIG. 5 is a sectional view illustrating another embodiment of the display device according to the present invention.
Figure 6:
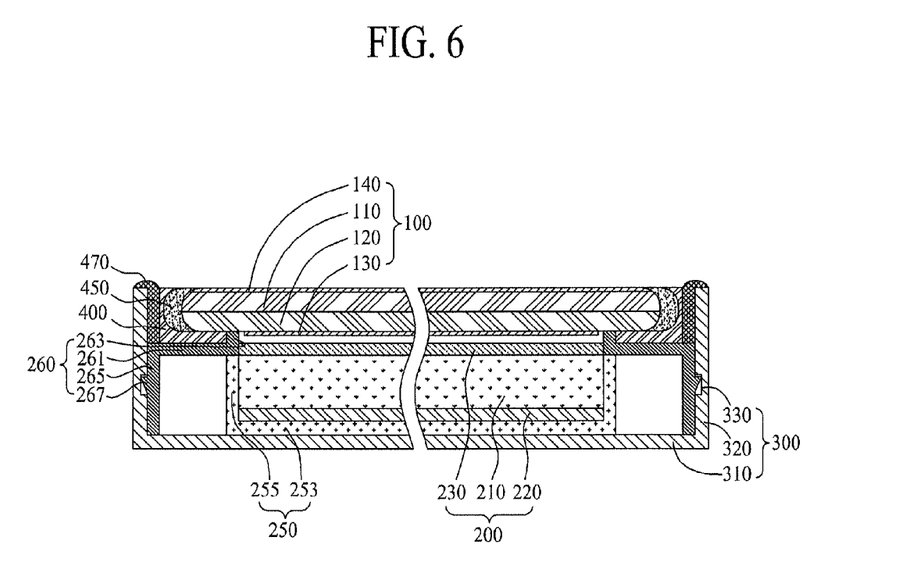
FIG. 6 is a sectional view illustrating another embodiment of the display device according to the present invention.

FIGS. 5 and 6 are sectional views illustrating another embodiment of the display device according to the present invention.

As seen in FIGS. 5 and 6, a display device according to another embodiment of the present invention may include the display panel 100, the backlight unit 200, the cover member 300, the adhesive member 400, the bumper part 470, and a supporting pad 470. In the following description, to avoid a repetitive description, differences between the embodiment of FIG. 3 and the embodiments of FIGS. 5 and 6 will be described.

The supporting pad 470 is formed between the cover member 300 and the side wall of the display panel 100, and particularly, formed higher by a predetermined height than the display panel 100.

Since the supporting pad 470 is formed higher by the predetermined height than the display panel 100, the supporting part 470 can prevent the display panel 100 from being pressed. For example, when the display device according to the present invention is a product such as the notebook computer of FIG. 1, the supporting pad 470 can prevent the load applied to the display panel 100.

The supporting pad 470 may be formed of an elastic material, and can absorb an impact. In an embodiment, the supporting pad 470 may include a material such as rubber, urethane, polycarbonate or the like. Also, the supporting pad 470 may be colorless (or transparent) or colored (for example, blue, red, or black), but is not limited thereto. The color of the supporting pad 470 may be selected depending on the design of the display device.

In each of the above-described embodiments of the present invention, the display device has been described as being an LCD device including the display panel 100 and the backlight unit 200. However, the display device according to the present invention is not limited thereto, and for example, the display panel 100 may be replaced by an organic light emitting display panel including a plurality of organic light emitting elements. In this case, since the organic light emitting elements are self-emitting elements, the backlight unit 200 is not provided, and moreover, the supporting case 250 may not be provided.

In this case, the display panel 100 that is the organic light emitting display panel may include a lower substrate and an upper substrate facing-coupled to the lower substrate.

The lower substrate includes a plurality of emission pixels that are respectively formed in a plurality of areas defined by a plurality of gate line, data lines, and power lines. Each of the emission pixels may include at least one switching transistor connected to a gate line and a data line, at least one driving transistor connected to the switching transistor and a power (VDD) line, and a light emitting element that emits light with a current controlled according to the switching of the driving transistor.

The upper substrate is facing-coupled to the lower substrate, and protects the plurality of light emitting elements formed in the lower substrate. Here, the upper substrate may include a plurality of light emitting elements respectively connected to the plurality of driving transistors formed in the lower substrate, in which case the light emitting elements are not formed in the lower substrate.

Figure 7A:
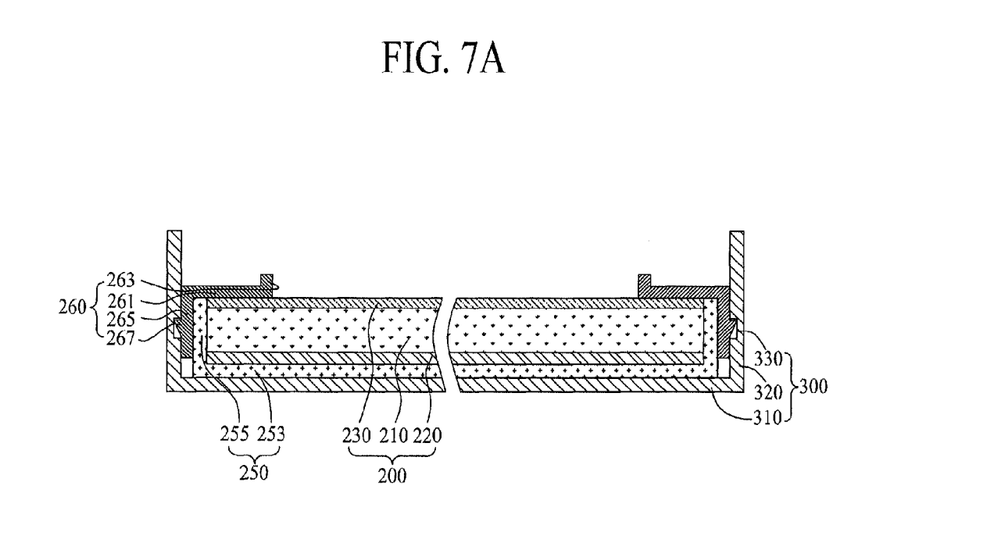
FIGS. 7A to 7C are views illustrating a method of manufacturing a display device according to the present invention.
Figure 7B:
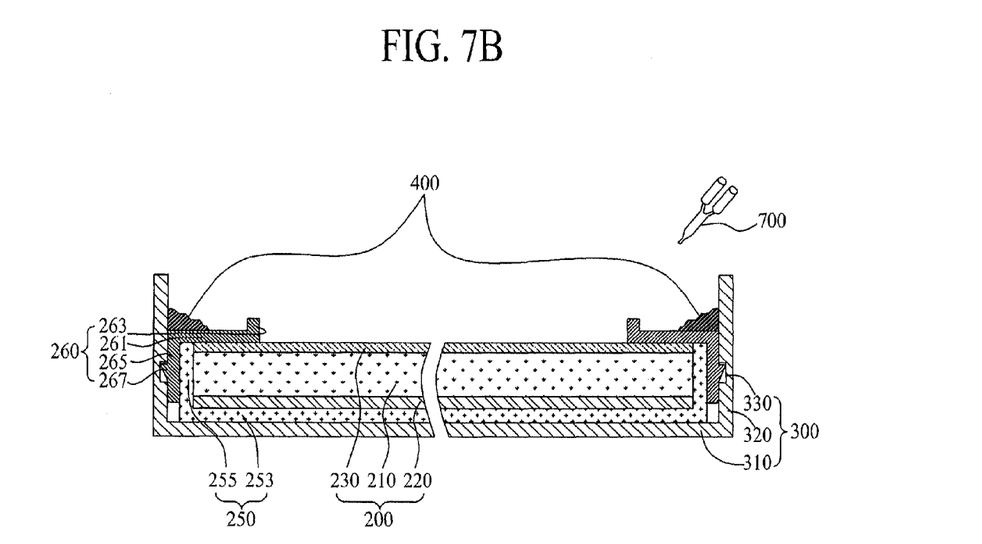
Figure 7C:
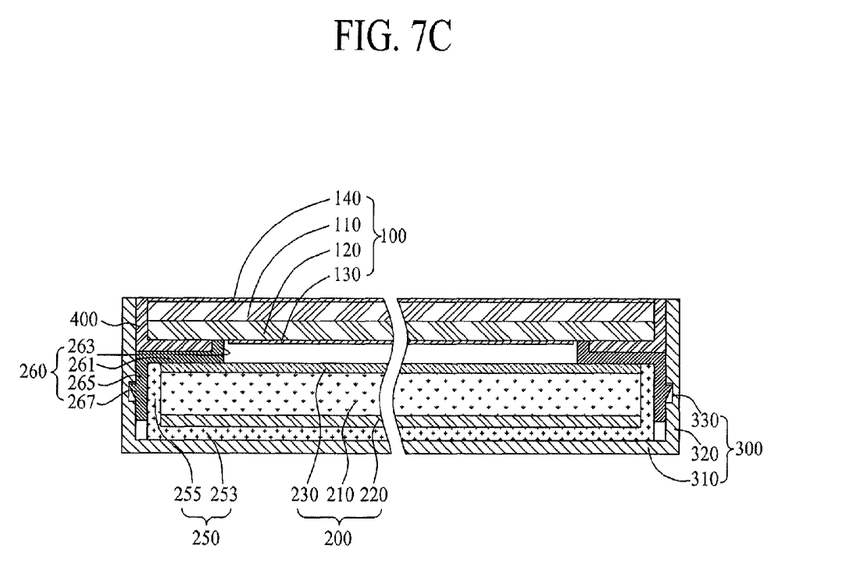

FIGS. 7A to 7C are views illustrating a method of manufacturing a display device according to the present invention.

First, as seen in FIG. 7A, the backlight unit 200 supplying light to the display panel 100 is placed in the cover member 300. The guide frame 260, which includes the horizontal part 261 and the first prevention jaw 263 (which is formed to protrude from one end of the horizontal part 261) and guides the position of the display panel 100 and the position of the backlight unit 200, is assembled to the display panel 100.

Subsequently, as seen in FIG. 7B, the adhesive member 400 that couples the guide frame 260 and the display panel 100 is injected into a space in which the horizontal part 261, the first prevention jaw 263, and the cover member 300 are formed.

In this case, only when an accurate amount of adhesive member is injected, the present invention can prevent that the adhesive member 400 passes over the first prevention jaw 263 and is injected into the backlight unit 200. In an embodiment, a dispenser may be used for injecting an accurate amount of adhesive member.

Subsequently, as seen in FIG. 7C, by coupling the display panel 100 to the guide frame 260 and the cover member 300, the adhesive member 400 is coupled to the guide frame 260 and the display panel 100.

In this case, the adhesive member 400 still has fluidity and is insufficient in adhesive strength, and thus, the adhesive member 400 is hardened at a room temperature after a predetermine time elapses, hardened by applying heat at a predetermined temperature, or hardened by irradiating UV.

According to the display device and the method of manufacturing the same according to the present invention, the following features are realized. First, by removing the upper case and the front set cover, the thickness of the display device and the width of the front border are minimized, and the step height of the border is removed, thus enhancing the aesthetic appearance in terms of a design. Second, the bumper part is disposed between the display panel and the cover member, and prevents the partial detachment of the film member, thus preventing moisture or the like from penetrating into the display panel. That is, according to the present invention, display devices having the features can be manufactured.

As described above, by removing the upper case and the front set cover, the present invention can minimize the thickness of the display device and the width of the front border and removes the step height of the border, thus enhancing the aesthetic appearance in terms of a design.

Moreover, the present invention can enhance adhesive strength between the display panel and the guide panel, and thus, the guide panel can be adhered to the display panel even through a small adhesive area.

Moreover, the bumper part cannot be provided between the display panel and the cover member, and thus, the present invention cannot perform the grinding process and the side sealing process due to the bumper part.

Moreover, although the bumper part is not provided, the adhesive member fills the space between the side wall of the display panel and the cover member, thus preventing moisture from penetrating into the display panel and preventing a foreign material from penetrating through a gap.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a display panel comprising an upper substrate and a lower substrate facing-coupled to a rear surface of the upper substrate;
    a backlight unit that supplies light to the display panel;
    a cover member that receives the display panel, and covers a side surface of the display panel;
    a guide frame that supports the display panel, and guides a position of the display panel and a position of the backlight unit; and
    an adhesive member injected between the guide frame and the display panel, and coupling the guide frame and the display panel,
    wherein, the guide frame comprises:
    a horizontal part; and
    a first prevention jaw that protrudes from one end of the horizontal part, and prevents the adhesive member from being injected into the backlight unit when injecting the adhesive member.

2. The display device of claim 1, wherein the adhesive member is adhered to one side wall of the first prevention jaw, an upper side surface of the horizontal part, and a lower side surface of the display panel, thereby coupling the guide frame and the display panel.

3. The display device of claim 2, wherein the adhesive member is further adhered to an inner wall of the cover member and a side wall of the display panel, thereby coupling the guide frame, the display panel, and the cover member.

4. The display device of claim 1, wherein the adhesive member absorbs light and prevents light, emitted from the backlight unit, from passing through adhesive member.

5. The display device of claim 1, wherein the adhesive member is one of an urethane-based material, an acrylic-based material, an epoxy-based material, and a cyanoacrylate-based material.

6. The display device of claim 1, further comprising a bumper part formed to be extended from a side wall of the display panel, and protecting the side wall of the display panel.

7. The display device of claim 1, wherein the cover member comprises a side part covering the side surface of the display panel, the side part being the same height as the display panel and not at a top of the display panel.

8. The display device of claim 1, further comprising a supporting pad between the cover member and a side wall of the display panel, the supporting pad being higher by a predetermined height than the display panel.

9. A method of manufacturing a display device, comprising:
    placing a backlight unit, which supplies light to a display panel, in a cover member, and assembling a guide frame that comprises a horizontal part and a first prevention jaw formed to protrude from one end of the horizontal part, and guides a position of the display panel and a position of the backlight unit;
    injecting an adhesive member into a space formed by the horizontal part, the first prevention jaw, and the cover member, the adhesive member coupling the display panel to the guide frame; and
    coupling the display panel to the guide frame and the cover member for the adhesive member to couple the guide frame and the display panel,
    wherein the first prevention jaw prevents the adhesive member from being injected into the backlight unit when injecting the adhesive member.

10. The method of claim 9, wherein the adhesive member is hardened at a room temperature after a predetermine time elapses, hardened by applying heat at a predetermined temperature, or hardened by irradiating UV.

* * * * *